(12) United States Patent
Rajan

(10) Patent No.: US 7,685,178 B2
(45) Date of Patent: Mar. 23, 2010

(54) SYSTEM AND METHOD FOR EXAMINING CLIENT GENERATED CONTENT STORED ON A DATA CONTAINER EXPORTED BY A STORAGE SYSTEM

(75) Inventor: Vijayan Rajan, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 187 days.

(21) Appl. No.: 11/590,735

(22) Filed: Oct. 31, 2006

(65) Prior Publication Data

US 2008/0104144 A1    May 1, 2008

(51) Int. Cl.
*G06F 17/00* (2006.01)
*G06F 17/30* (2006.01)
*G06F 12/00* (2006.01)

(52) U.S. Cl. .......................... 707/204; 707/1; 707/205; 711/170

(58) Field of Classification Search .................... 707/1, 707/204, 205; 711/170
See application file for complete search history.

(56) References Cited

U.S. PATENT DOCUMENTS

| | | |
|---|---|---|
| 4,570,217 A | 2/1986 | Allen et al. |
| 5,124,987 A | 6/1992 | Milligan et al. |
| 5,163,131 A | 11/1992 | Row et al. |
| 5,202,979 A | 4/1993 | Hillis et al. |
| 5,278,979 A | 1/1994 | Foster et al. |
| 5,403,667 A | 4/1995 | Simoens |
| 5,581,724 A | 12/1996 | Belsan et al. |
| 5,819,292 A | 10/1998 | Hitz et al. |
| 6,061,770 A | 5/2000 | Franklin |
| 6,081,875 A | 6/2000 | Clifton et al. |
| 6,341,341 B1 | 1/2002 | Grummon et al. |
| 6,668,264 B1 | 12/2003 | Patterson et al. |
| 6,880,053 B2 * | 4/2005 | Kiselev et al. ............... 711/162 |
| 6,889,228 B1 | 5/2005 | Federwisch et al. |
| 6,915,316 B1 | 7/2005 | Patterson et al. |
| 6,993,539 B2 | 1/2006 | Federwisch et al. |
| 7,007,046 B2 | 2/2006 | Manley et al. |
| 7,010,553 B2 | 3/2006 | Chen et al. |
| 7,039,663 B1 | 5/2006 | Federwisch et al. |
| 7,043,485 B2 | 5/2006 | Manley et al. |
| 7,107,385 B2 | 9/2006 | Rajan et al. |
| 7,127,577 B2 | 10/2006 | Koning et al. |
| 7,203,796 B1 | 4/2007 | Muppalaneni et al. |
| 7,225,204 B2 | 5/2007 | Manley et al. |

(Continued)

OTHER PUBLICATIONS

Akyurek, Sedat, *Placing Replicated Data to Reduce Seek Delays*, De-partment of Computer Science, University of Maryland, UMIACS-TR-91-121, CS-TR-2746, Aug. 1991.

(Continued)

*Primary Examiner*—James Trujillo
*Assistant Examiner*—Bruce M Moser
(74) *Attorney, Agent, or Firm*—Cesari and McKenna, LLP

(57) ABSTRACT

A system and method for examining the content of a client file system stored on an exported lun is provided. A client agent interfaces with a client file system to determine block layout information of data containers within the client file system. This block layout information is then transmitted to the storage system exporting the lun. The storage system utilizes the block layout information to generate a shadow volume utilizing the storage system's file system.

44 Claims, 13 Drawing Sheets

U.S. PATENT DOCUMENTS

| | | | |
|---|---|---|---|
| 7,325,109 | B1 | 1/2008 | Muppalaneni et al. |
| 7,409,494 | B2 | 8/2008 | Edwards et al. |
| 2004/0002934 | A1 | 1/2004 | Taulbee et al. |
| 2004/0030822 | A1* | 2/2004 | Rajan et al. ............... 711/4 |
| 2005/0246401 | A1 | 11/2005 | Edwards et al. |
| 2006/0184587 | A1 | 8/2006 | Federwisch et al. |
| 2006/0218210 | A1 | 9/2006 | Sarma et al. |
| 2009/0006792 | A1 | 1/2009 | Federwisch et al. |
| 2009/0030983 | A1 | 1/2009 | Malaiyandi et al. |

OTHER PUBLICATIONS

Bitton, Dina, *Disk Shadowing*, Proceedings of the 14$^{th}$ VLDB Conference, LA, CA 1988.

Chaudhuri, Surajit, et al., *Self-Tuning Technology in Microsoft SQL Server*, Data Engineering Journal 22, 2 1999 pp. 20-27.

Chutani, Sailesh, et al., *The Episode File System*, In Proceedings of the USENIX Winter 1992.

Coyne, Robert A., et al., *Storage Systems for National Information As-sets*, Proc. Supercomputing 92, Minneapolis, Nov. 1992, pp. 626-633.

Finlayson, Ross S., et al., *Log Files: An Extended File Service Exploit-ing Write-Once Storage* Department of Computer Science, Stanford University, Report No. STAN-CS-87/1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms*, IEEE Transactions on Software Engineering, 14( 2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104 .

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, 2 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, 2 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, 2 1999 pp. 28-32.

Weikum, Gerhard, et al., *Towards Self-Tuning Memory Management for Data Servers*, Data Engineering Journal 22, 2 1999 pp. 3-11.

West, Michael, et al. *The ITC Distributed File System: Proto-type and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

Federwisch et al. "System and Method for Determining Changes in Two Snapshots and for Transmitting Changes to a Destination Snapshot", filed Jan. 20, 2006 as U.S. Appl. No. 11/336,021, 70 pages.

Lin et al. "System and Method for Transparent Data Replication over Migrating Virtual Servers", filed Apr. 24, 2007 as U.S. Appl. No. 11/739,239, 30 pages.

"Notification of Transmittal of the International Search Report and the Written Opinion of the International Searching Authority, or the Declaration," International Filing Date: Oct. 31, 2007, International Application No. PCT/US2007/022966, Applicant: Network Applicance, Inc., Date of Mailing: Feb. 20, 2008, all pages.

\* cited by examiner

SYSTEM AND METHOD FOR EXAMINING CLIENT GENERATED CONTENT STORED ON A DATA CONTAINER EXPORTED BY A STORAGE SYSTEM

FIELD OF THE INVENTION

The present invention relates to storage systems and, in particular, to examining client generated content stored on a data container exported by a storage system.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored. As used herein a file is defined to be any logical storage container that contains a fixed or variable amount of data storage space, and that may be allocated storage out of a larger pool of available data storage space. As such, the term file, as used herein and unless the context otherwise dictates, can also mean a data container, object or any other storage entity that does not correspond directly to a set of fixed data storage devices. A file system is, generally, a computer system for managing such files, including the allocation of fixed storage space to store files on a temporary or permanent basis.

The storage system may be further configured to operate according to a client/server model of information delivery to thereby allow many client systems (clients) to access shared resources, such as files, stored on the storage system. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (LUN).

In some SAN environments, storage systems may export virtual disks (vdisks) to clients utilizing block-based protocols, such as, for example, Fibre Channel and iSCSI. One example of a vdisk is a special file type in a volume that derives from a plain file, but that has associated export controls and operation restrictions that support emulation of a disk. Vdisks are described further in U.S. Pat. No. 7,107,385, entitled STORAGE VIRTUALIZATION BY LAYERING VIRTUAL DISK OBJECTS ON A FILE SYSTEM, by Vijayan Rajan, et al., issued on Sep. 12, 2006, the contents of which are hereby incorporated by reference. These block-based protocols and the exported file/vdisks appear as physical disk devices to the clients of the storage system.

In such SAN environments where storage systems export virtual disks as luns that can be accessed by clients using block-based protocols, an administrator typically organizes logical volumes using the exported luns. A client file system is layered on top of the logical volumes and numerous files, directories and/or other data containers are created and stored within this client file system. Data is then managed by the client in terms of the logical volumes and files built onto the client file system. In such environments, many of the data management techniques provided by the storage system are not available as the storage system is unaware of the client file system and the data constructs therein. The storage system is thus limited to management of data on a per lun basis. Client file systems are often general-purpose file systems and, as such, they do not include such specialized data management features. Accordingly, the use of client file systems layered on top of luns (vdisks) exported by a storage system do not permit exploitation of the full storage management capabilities of the storage system.

SUMMARY OF THE INVENTION

The disadvantages of the prior art are overcome by providing a system and method for examining contents of a client file system overlaid onto a data container, such as a logical unit number (lun), exported by a storage system. A client side agent executing on a client interfaces with the client file system to determine a logical block layout of files, directories and other data containers within the client file system. The block layout information is then transmitted to the storage system so that a file system executing on the storage system may have knowledge of the organization of data container content overlaid onto the exported lun. Such knowledge enables the storage system to perform additional data management and/or data protection techniques.

Illustratively, a storage operating system executing on the storage system may generate a shadow volume, which is a file-level accessible volume that shares data blocks with a volume of the client file system but is implemented in terms of the storage system's native file system semantics. The shadow volume may then be utilized in conjunction with data management techniques available to the storage system. For example, the shadow volume may be exported using file level protocols, such as the Network File System (NFS) protocol. Additionally, the shadow volume may be mirrored using conventional file-level mirroring techniques.

In an alternate embodiment, the block layout information may be utilized to restore a sub-volume data container from a persistent consistency point image (PCPI). When a data container stored on the client file system becomes corrupted, an administrator executes a restore program. The restore program, in conjunction with the client side agent, identifies blocks of the storage system file system that are associated with the corrupted data container. If these blocks have not been modified since the creation of the PCPI, then the client side agent requests the storage system to promote the identified blocks from the PCPI to the active file system. In response, the storage system promotes the identified blocks, thereby restoring the corrupted data container to a non-corrupted state.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System

The present invention may be implemented, in the illustrative embodiment, on a storage system that serves both file and block protocol access to information stored on storage devices in an integrated manner. In this context, the term storage system denotes a computer having features such as simplicity of storage service management and ease of storage reconfiguration, including reusable storage space, for users (system administrators) and clients of network attached storage (NAS) and storage area network (SAN) deployments. The storage system may provide NAS services through a file system, while the same system provides SAN services through SAN virtualization, including logical unit number (lun) emulation.

Figure 1:
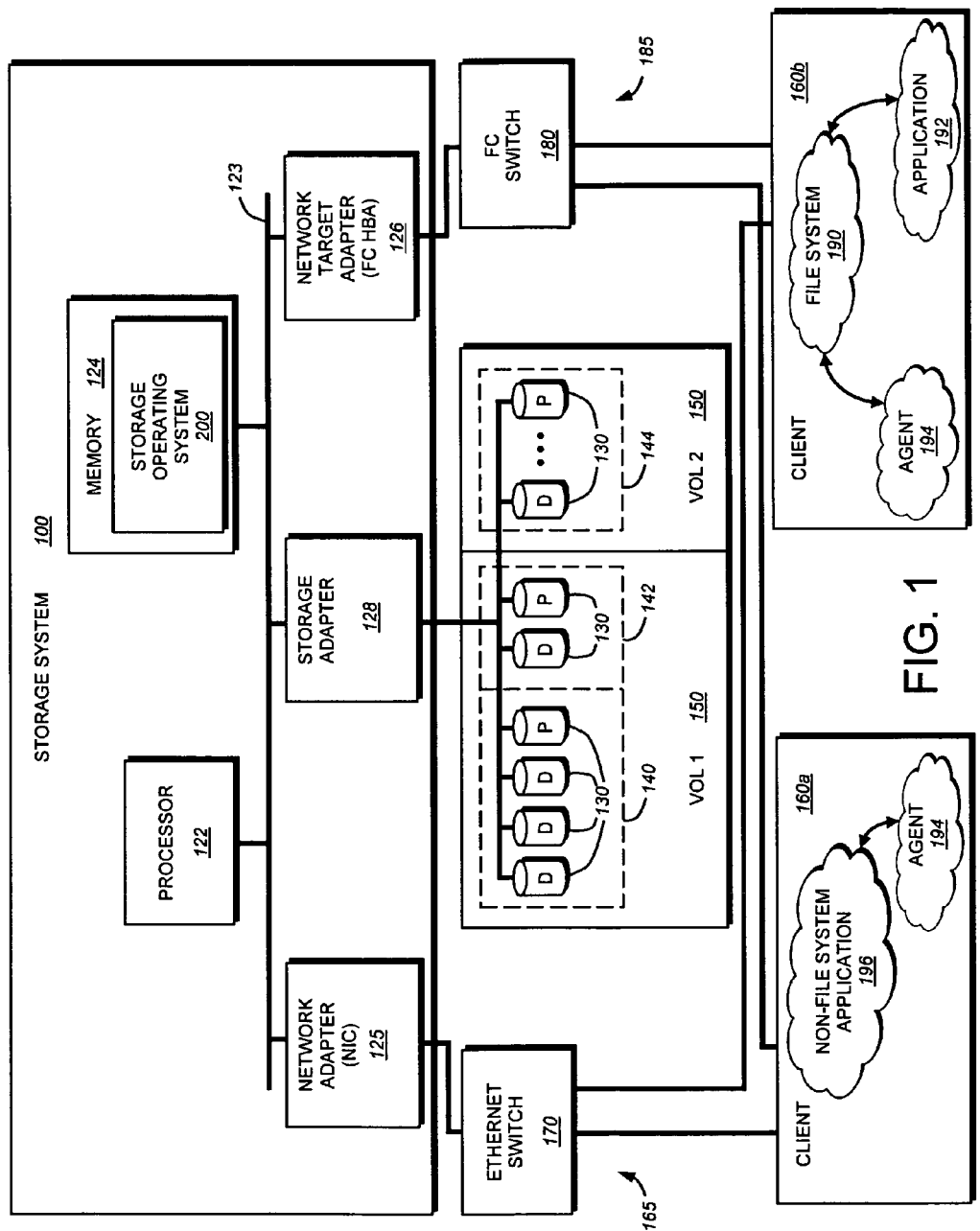
FIG. 1 is a schematic block diagram of an exemplary storage system environment in accordance with an embodiment of the present invention.

FIG. 1 is a schematic block diagram of a storage system 100 configured to provide storage service relating to the organization of information on storage devices, such as disks 130. The storage system 100 illustratively comprises a processor 122, a memory 124, a plurality of network adapters 125, 126 and a storage adapter 128 interconnected by a system bus 123. The storage system 100 also includes a storage operating system 200 that provides a virtualization system (and, in particular, a file system) to logically organize the information as a hierarchical structure of named directory, file and virtual disk (vdisk) storage objects on the disks 130.

Whereas clients of a NAS-based network environment have a storage viewpoint of files, the clients of a SAN-based network environment have a storage viewpoint of blocks or disks. To that end, the storage system 100 presents (exports) disks to SAN clients through the creation of luns or vdisk objects. A vdisk object (hereinafter "vdisk") is lo a special file type that is implemented by the virtualization system and translated into an emulated disk as viewed by the SAN clients. The storage system thereafter makes these vdisks accessible to the SAN clients through controlled exports, as described further herein.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the storage system by, inter alia, invoking storage operations in support of the storage service implemented by the system. It will be apparent to those skilled in the art that other processing and memory means, including various computer readable media, may be used for storing and executing program instructions pertaining to the inventive system and method described herein.

The network adapter 125 couples the storage system to a plurality of clients 160*a,b* over point-to-point links, wide area networks, virtual private networks implemented over a public network (Internet) or a shared local area network, hereinafter referred to as an illustrative Ethernet network 165. Therefore, the network adapter 125 may comprise a network interface card (NIC) having the mechanical, electrical and signaling circuitry needed to connect the system to a network switch, such as a conventional Ethernet switch 170. For this NAS-based network environment, the clients are configured to access information stored on the multi-protocol system as files. The clients 160 communicate with the storage system over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 160 may request the services of the storage system 100 by issuing file access protocol messages (in the form of packets) to the system over the network 165. It will be apparent to those skilled in the art that other clients running other types of operating systems may also communicate with the integrated multi-protocol storage system using other file access protocols.

The storage network "target" adapter 126 also couples the storage system 100 to clients 160 that may be further configured to access the stored information as blocks or disks. For this SAN-based network environment, the storage system is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the system 100 to a SAN network switch, such as a conventional FC switch 180. In addition to providing FC access, the FC HBA may offload Fibre Channel network processing operations for the storage system.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage system 100. In SCSI terminology, clients 160 operating in a SAN environment are initiators that initiate requests and commands for data. The multi-protocol storage system is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The storage system 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage system 100) by issuing iSCSI and FCP messages over the network 165, 185 to access information stored on the disks. It will be apparent to those skilled in the art that the clients may also request the services of the integrated storage system using other block access protocols. By supporting a plurality of block access protocols, the storage system provides a unified and coherent access solution to vdisks/luns in a heterogeneous SAN environment.

Illustratively, client (or host) 160*b* includes a file system 190 that interfaces with one or more applications 192 and that is overlaid onto a data container serviced by the storage system. For example, the storage system may export a lun, which the client file system 190 utilizes to store data. In addition, a novel client agent 194 executes on client 160*b*. According to an illustrative embodiment of the invention, the agent 194 obtains block layout information from the client file system 190 and forwards the block layout information to the storage system 100, as described further below. In accordance with an alternate embodiment of the present invention, a non-file system application 196 such as a database system or other system executes on client 160*a*. The novel agent 194 may also execute on client 160*a* and interface with the non-file system application 196. Notably, the teachings of the present invention are applicable to any environment where structured storage is overlaid onto a data container exported by the storage system 100. As such, the description of the novel agent 194 interfacing with a file system 190 or application 196 should be taken as exemplary only.

The storage adapter 128 cooperates with the storage operating system 200 executing on the storage system to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the system 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed.

B. Storage Operating System

To facilitate access to the disks 130, the storage operating system 200 implements a write-anywhere file system of a virtualization system that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN system approach to storage by enabling file-based (NAS) access to the named files and directories, while further enabling block-based (SAN) access to the named vdisks on a file-based storage platform. The file system simplifies the complexity of management of the underlying physical storage in SAN deployments.

As noted, a vdisk is a special file type in a volume that derives from a plain (regular) file, but that has associated export controls and operation restrictions that Support emulation of a disk. Unlike a file that can be created by a client using, e.g., the NFS or CIFS protocol, a vdisk is created on the storage system via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow luns and exports to persist over, e.g., reboot operations, while also enabling management of the vdisk as a single disk object in relation to SAN clients. An example of a vdisk and its associated inodes that may be advantageously used with the present invention is described in U.S. Pat. No. 7,107,385, entitled STORAGE VIRTUALIZATION BY LAYERING VDISKS ON A FILE SYSTEM, by Vijayan Rajan, et al., issued on Sep. 12, 2006, which application is hereby incorporated by reference as though fully set forth herein.

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system, including a write in-place file system, may be enhanced for use in accordance with the inventive principles described herein. As such, where the term "WAFL" is employed, it should be taken broadly to refer to any file system that is otherwise adaptable to the teachings of this invention.

As used herein, the term "storage operating system" generally refers to the computer-executable code operable on a computer that manages data access and may, in the case of a multi-protocol storage system, implement data access semantics, such as the Data ONTAP storage operating system, which is implemented as a microkernel. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive system and method described herein may apply to any type of special-purpose (e.g., storage serving system) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
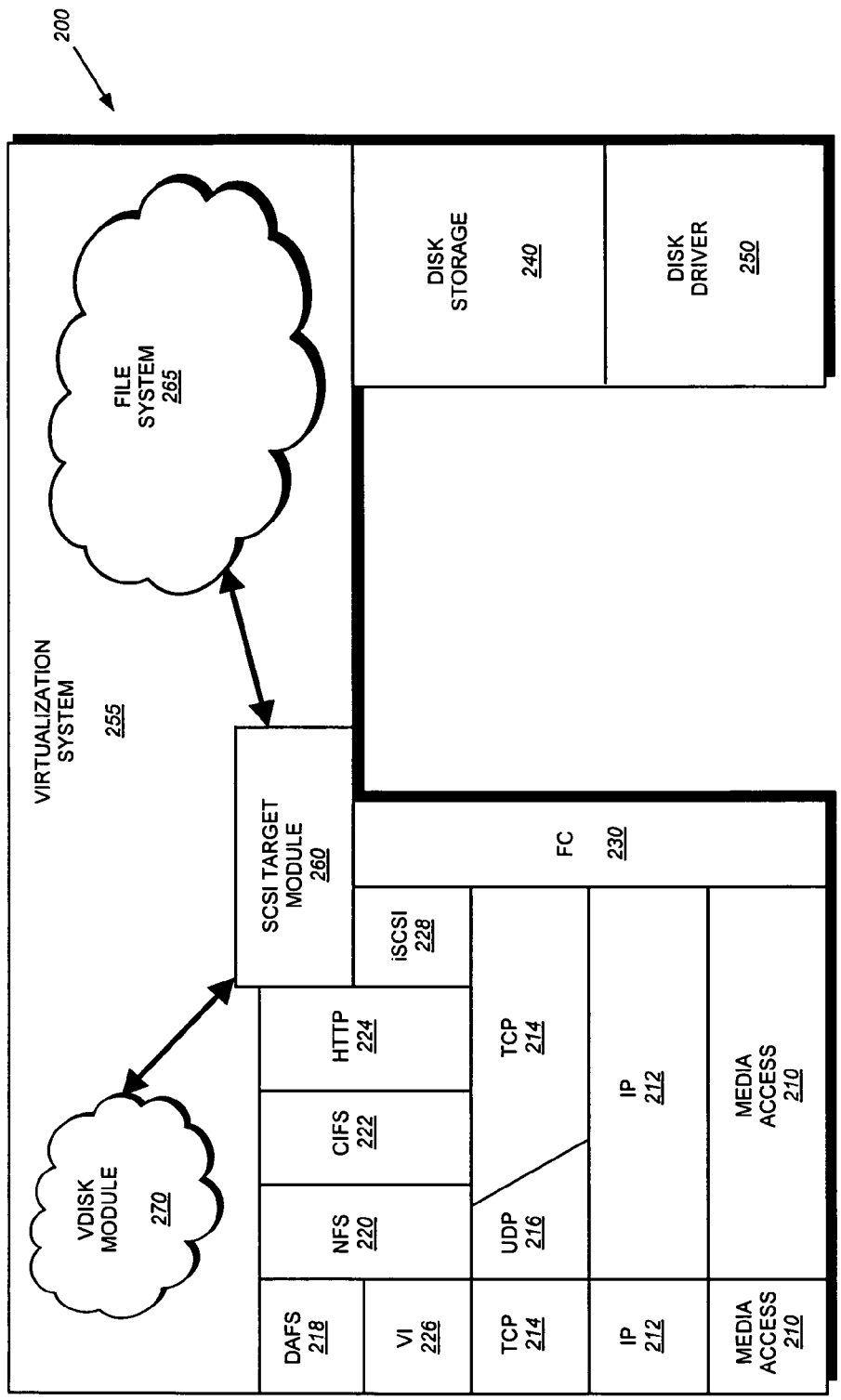
FIG. 2 is a schematic block diagram of an exemplary storage operating system in accordance with an embodiment of the present invention.

FIG. 2 is a schematic block diagram of an exemplary storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A Virtual Interface (VI) layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage system. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage system. In addition, the storage operating system includes a disk storage layer 240 that implements a disk storage protocol, such as a RAID protocol, and a disk driver layer 250 that implements a disk access protocol such as, e.g., a SCSI protocol.

Bridging the disk software layers with the integrated network protocol stack layers is a virtualization system 255 that is implemented by a file system 265 cooperating with virtualization modules illustratively embodied as, e.g., vdisk module 270 and SCSI target module 260. It should be noted that the vdisk module 270, file system 265 and SCSI target module 260 can be implemented in software, hardware, firmware, or a combination thereof. The vdisk module 270 is layered on (and interacts with) the file system 265 to provide a data path from the block-based SCSI target module to blocks managed by the file system. In essence, the vdisk module 270 manages SAN deployments by, among other things, implementing a comprehensive set of vdisk (lun) commands issued through a user interface by a system administrator. These vdisk commands are converted to primitive file system operations ("primitives") that interact with the file system 265 and the SCSI target module 260 to implement the vdisks.

The SCSI target module 260, in turn, initiates emulation of a disk or lun by providing a mapping procedure that translates logical block access to luns specified in access requests into virtual block access to the special vdisk file types and, for responses to the requests, vdisks into luns. The SCSI target module is illustratively disposed between the FC and iSCSI drivers 230, 228 and the file system 265 to thereby provide a translation layer of the virtualization system 255 between the SAN block (lun) space and the file system space, where luns are represented as vdisks.

The file system 265 illustratively implements the above-described WAFL file system having an on-disk format representation that is block-based using, e.g., 4 kilobyte (KB) blocks and using inodes to describe the files. Broadly stated, all inodes of the file system are organized into the inode file. A file system (fs) info block specifies the layout of information in the file system and includes an inode of a file that includes all other inodes of the file system. Each volume has an fsinfo block that is preferably stored at a fixed location within, e.g., a RAID group of the file system. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

It should be noted that the software "path" through the storage operating system layers described above needed to perform data storage access for the client request received at the multi-protocol storage system may alternatively be implemented in hardware. That is, in an alternate embodiment of the invention, a storage access request data path through the operating system layers (including the virtualization system 255) may be implemented as logic circuitry embodied within a field programmable gate array (FPGA) or an application specific integrated circuit (ASIC). This type of hardware implementation increases the performance of the storage service provided by system 100 in response to a file access or block access request issued by a client 160. Moreover, in another alternate embodiment of the invention, the processing elements of network and storage adapters 125-128 may be configured to offload some or all of the packet processing and storage access operations, respectively, from processor 122 to thereby increase the performance of the storage service provided by the multi-protocol storage system. It is expressly contemplated that the various processes, architectures and procedures described herein can be implemented in hardware, firmware or software.

C. File System Organization

Figure 3:
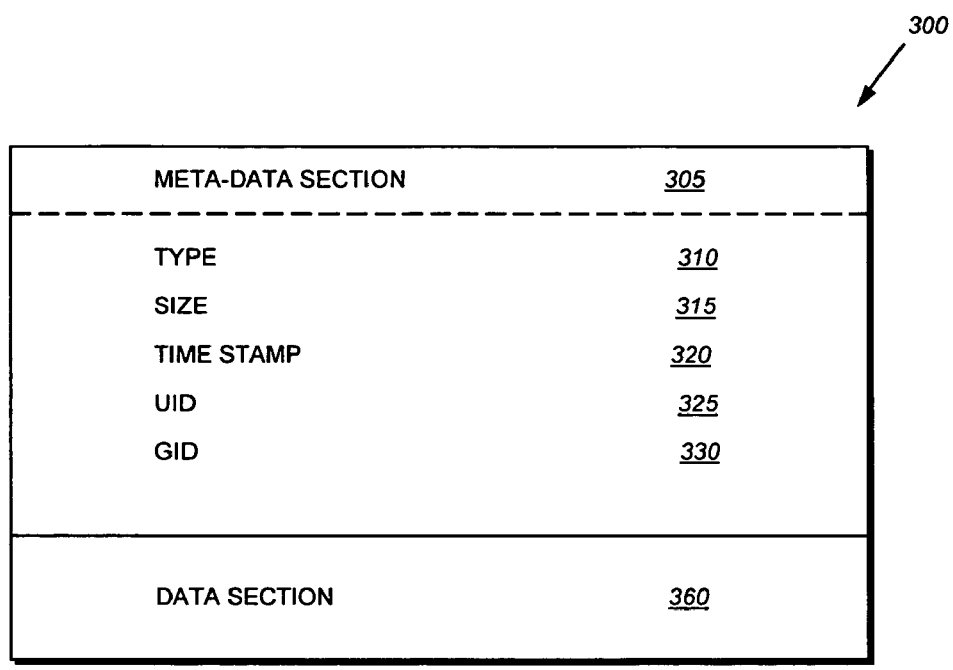
FIG. 3 is a schematic block diagram of an exemplary inode in accordance with an embodiment of the present invention.

In the illustrative embodiment, a data container is represented in the write-anywhere file system as an inode data structure adapted for storage on the disks 130. FIG. 3 is a schematic block diagram of an inode 300, which preferably includes a meta-data section 305 and a data section 360. The information stored in the meta-data section 305 of each inode 300 describes the data container (e.g., a file) and, as such, includes the type (e.g., regular, directory, vdisk) 310 of file, its size 315, time stamps (e.g., access and/or modification time) 320 and ownership, i.e., user identifier (UID 325) and group ID (GID 330), of the file. The contents of the data section 360 of each inode may be interpreted differently depending upon the type of file (inode) defined within the type field 310. For example, the data section 360 of a directory inode contains meta-data controlled by the file system, whereas the data section of a regular inode contains file system data. In this latter case, the data section 360 includes a representation of the data associated with the file.

Specifically, the data section 360 of a regular on-disk inode may include file system data or pointers, the latter referencing 4 KB data blocks on disk used to store the file system data. Each pointer is preferably a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 360 of the inode (e.g., a second level inode) references an indirect block (e.g., a first level L1 block) that contains 1024 pointers, each of which references a 4 KB data block on disk. For file system data having a size greater than 64 MB, each pointer in the data section 360 of the inode (e.g., a third level L3 inode) references a double-indirect block (e.g., a second level L2 block) that contains 1024 pointers, each referencing an indirect (e.g., a first level L1) block. The indirect block, in turn, that contains 1024 pointers, each of which references a 4 KB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 300 indicates the in-core representation of the on-disk inode structure. The in-core structure is a block of memory that stores the on-disk structure plus additional information needed to manage data in the memory (but not on disk). The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 4:
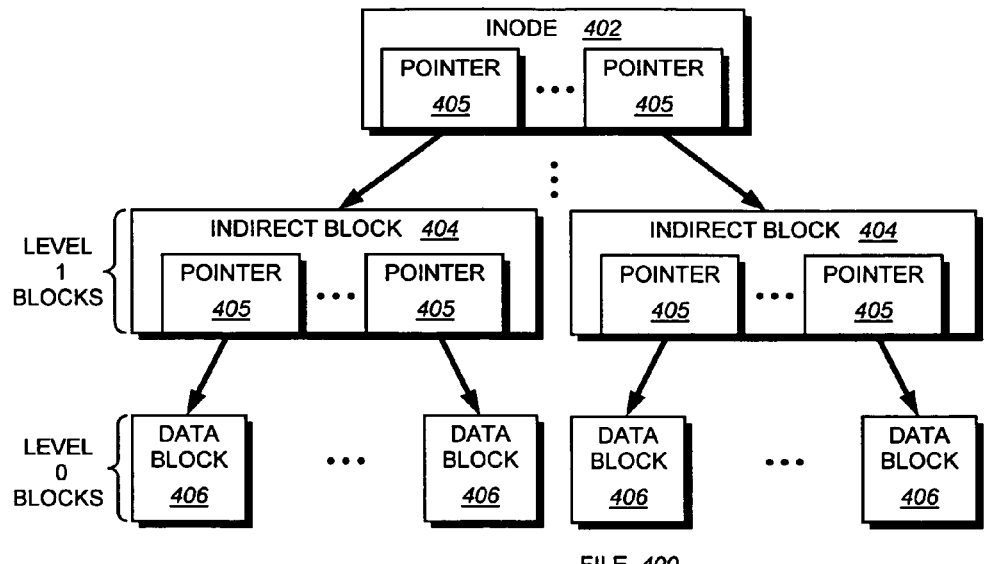
FIG. 4 is a schematic block diagram of an exemplary buffer tree in accordance with an embodiment of the invention.

FIG. 4 is a schematic block diagram of an embodiment of a buffer tree of a file that may be advantageously used with the present invention. The buffer tree is an internal representation of blocks for a file (e.g., file 400) loaded into the memory 124 and maintained by the write-anywhere file system 265. A root (top-level) inode 402, such as an embedded inode, references indirect (e.g., level 1) blocks 404. Note that there may be additional levels of indirect blocks (e.g., level 2, level 3) depending upon the size of the file. The indirect blocks (and inode) contain pointers 405 that ultimately reference data blocks 406 used to store the actual data of the file. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as system 100. An example of such a file system layout is described in U.S. Pat. No. 7,409,494 entitled EXTENSION OF WRITE ANYWHERE FILE SYSTEM LAYOUT, by John K. Edwards et al., issued on Aug. 5, 2008, and assigned to Network System, Inc. The underlying physical volume is an aggregate comprising one or more groups of disks, such as RAID groups, of the system. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 400) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk, dbn occurs at the file system/RAID system boundary of the storage operating system 200.

Figure 5:
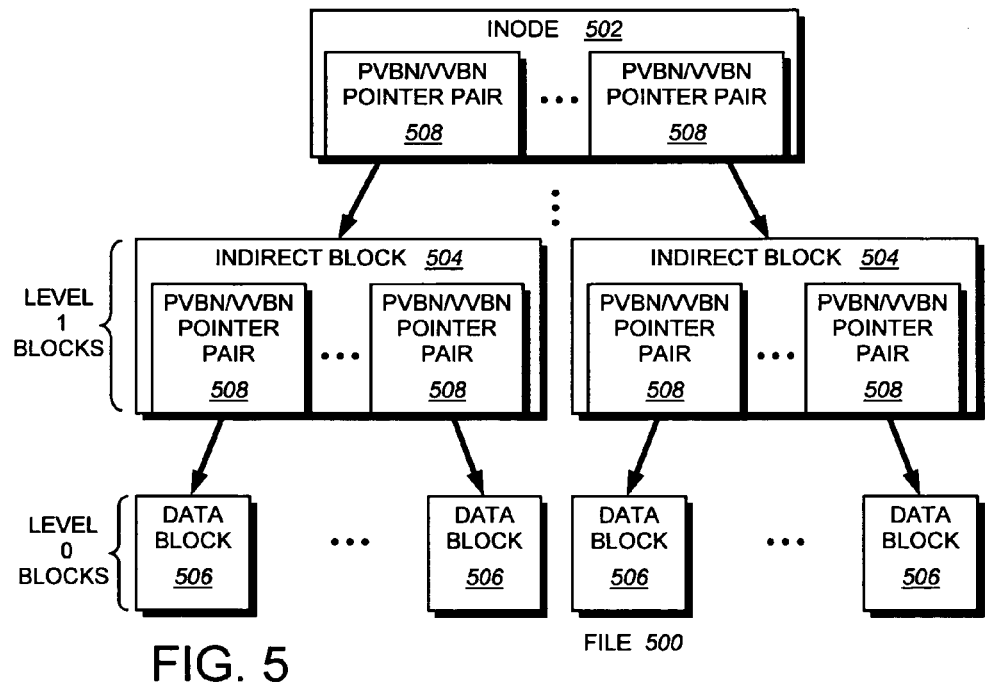
FIG. 5 is a schematic block diagram of an exemplary buffer tree in accordance with an embodiment of the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 5 is a schematic block diagram of an illustrative embodiment of a buffer tree of a file 500 that may be advantageously used with the present invention. A root (top-level) inode 502, such as an embedded inode, references indirect (e.g., level 1) blocks 504. Note that there may be additional levels of indirect blocks (e.g., level 2, level 3) depending upon the size of the file. The indirect blocks (and inode) contain pvbn/vvbn pointer pair structures 508 that ultimately reference data blocks 506 used to store the actual data of the file.

The pvbns reference locations on disks of the aggregate, whereas the vvbns reference locations within files of the flexible volume. The use of pvbns as block pointers 508 in the indirect blocks 504 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 6:
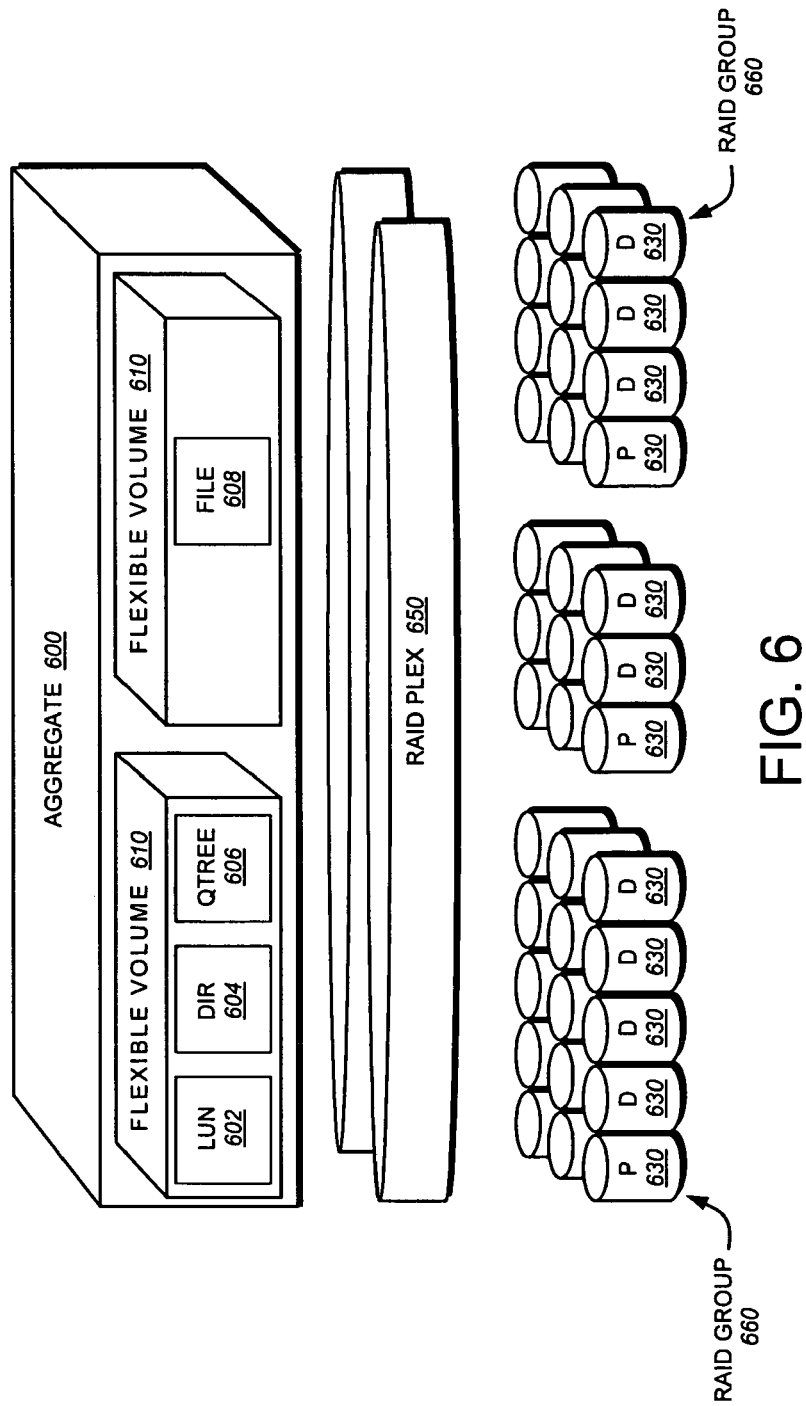
FIG. 6 is a schematic block diagram of an exemplary aggregate in accordance with an embodiment of the present invention.

FIG. 6 is a schematic block diagram of an embodiment of an aggregate 600 that may be advantageously used with the present invention. Luns (blocks) 602, directories 604, qtrees 606 and files 608 may be contained within flexible volumes 610, such as dual vbn flexible volumes, that, in turn, are contained within the aggregate 600. The aggregate 600 is illustratively layered on top of the RAID system, which is represented by at least one RAID plex 650 (depending upon whether the storage configuration is mirrored), wherein each plex 650 comprises at least one RAID group 660. Each RAID group further comprises a plurality of disks 630, e.g., one or more data (D) disks and at least one (P) parity disk.

Whereas the aggregate 600 is analogous to a physical volume of a conventional storage system, a flexible volume is analogous to a file within that physical volume. That is, the aggregate 600 may include one or more files, wherein each file contains a flexible volume 610 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 610 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 7:
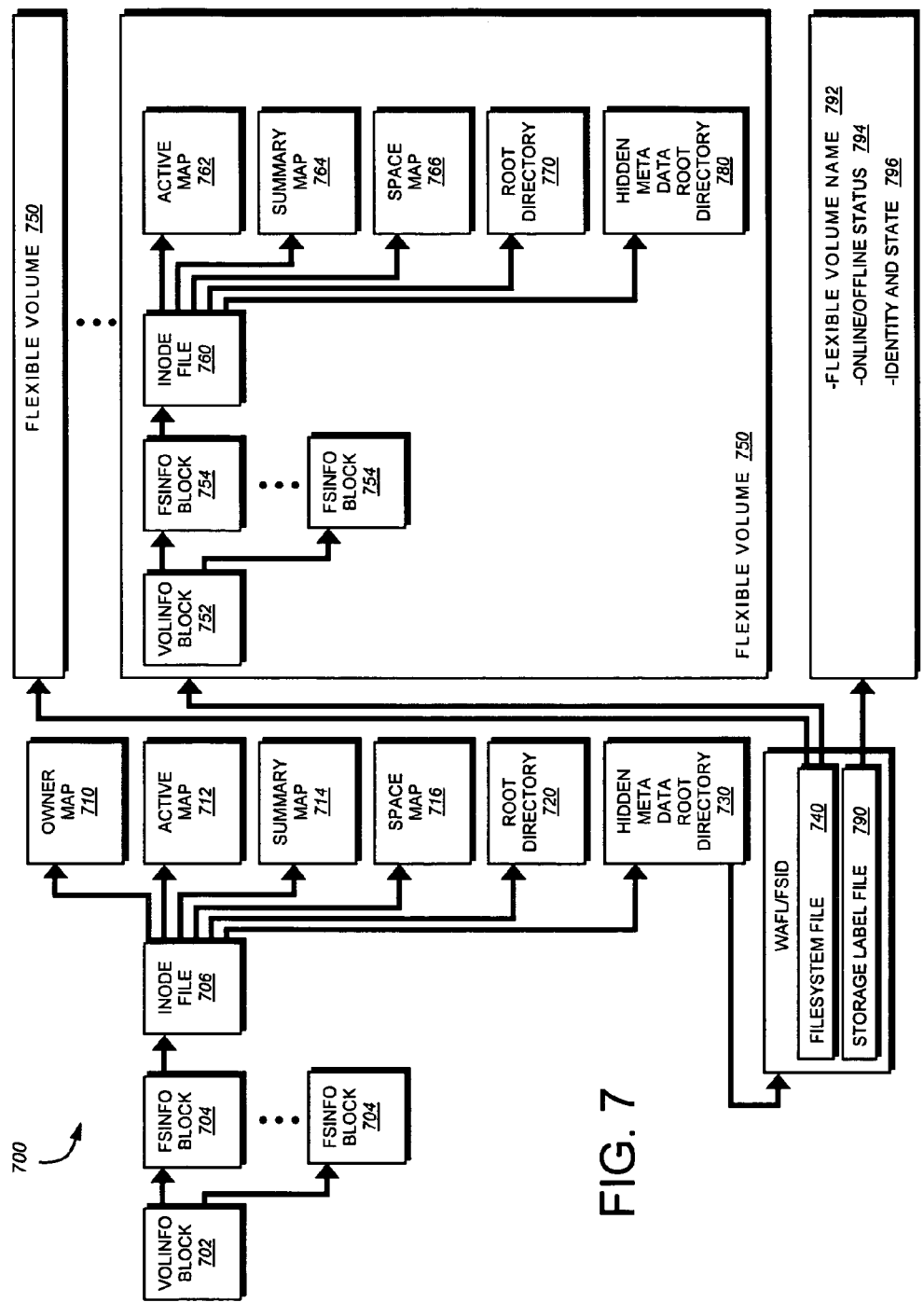
FIG. 7 is a schematic block diagram of an exemplary on-disk data structure of an aggregate in accordance with embodiment of the present invention.

FIG. 7 is a schematic block diagram of an on-disk representation of an aggregate 700. The storage operating system 200, e.g., the RAID system 240, assembles a physical volume of pvbns to create the aggregate 700, with pvbns 1 and 2 comprising a "physical" volinfo block 702 for the aggregate. The volinfo block 702 contains block pointers to fsinfo blocks 704, each of which may represent a snapshot of the aggregate. Each fsinfo block 704 includes a block pointer to an inode file 706 that contains inodes of a plurality of files, including an owner map 710, an active map 712, a summary map 714 and a space map 716, as well as other special meta-data files. The inode file 706 further includes a root directory 720 and a "hidden" meta-data root directory 730, the latter of which includes a namespace having files related to a flexible volume in which users cannot "see" the files. The hidden meta-data root directory includes the WAFL/fsid/directory structure that contains filesystem file 740 and storage label file 790. Note that root directory 720 in the aggregate is empty; all files related to the aggregate are organized within the hidden meta-data root directory 730.

In addition to being embodied as a container file having level 1 blocks organized as a container map, the filesystem file 740 includes block pointers that reference various file systems embodied as flexible volumes 750. The aggregate 700 maintains these flexible volumes 750 at special reserved inode numbers. Each flexible volume 750 also has special reserved inode numbers within its flexible volume space that are used for, among other things, the block allocation bitmap structures. As noted, the block allocation bitmap structures, e.g., active map 762, summary map 764 and space map 766, are located in each flexible volume.

Specifically, each flexible volume 750 has the same inode file structure/content as the aggregate, with the exception that there is no owner map and no WAFL/fsid/filesystem file, storage label file directory structure in a hidden meta-data root directory 780. To that end, each flexible volume 750 has a volinfo block 752 that points to one or more fsinfo blocks 754, each of which may represent a snapshot, along with the active file system of the flexible volume. Each fsinfo block, in turn, points to an inode file 760 that, as noted, has the same inode structure/content as the aggregate with the exceptions noted above. Each flexible volume 750 has its own inode file 760 and distinct inode space with corresponding inode numbers, as well as its own root (fsid) directory 770 and subdirectories of files that can be exported separately from other flexible volumes.

The storage label file 790 contained within the hidden meta-data root directory 730 of the aggregate is a small file that functions as an analog to a conventional raid label. A raid label includes physical information about the storage system, such as the volume name; that information is loaded into the storage label file 790. Illustratively, the storage label file 790 includes the name 792 of the associated flexible volume 750, the online/offline status 794 of the flexible volume, and other identity and state information 796 of the associated flexible volume (whether it is in the process of being created or destroyed).

It should be noted that while the present invention is described in terms of aggregates and flexible volumes, the principles of the present invention may be applied to other file system organizations. As such, the description of aggregates and flexible volumes should be taken as exemplary only.

D. Persistent Consistency Point Images

The file system illustratively has the capability to generate a snapshot of its active file system. An "active file system" is a file system to which data can be both written and read, or, more generally, an active store that responds to both read and write I/O operations. It should be noted that "snapshot" is a trademark of Network Appliance, Inc. and is used for purposes of this patent to designate a persistent consistency point image (PCPI). A (PCPI) is a space conservative, point-in-time read-only image of data accessible by name that provides a consistent image of that data (such as a storage system) at some previous time. More particularly, a PCPI is a point-in-time representation of a storage element, such as an active file system, file, volume or database, stored on a storage device (e.g., on disk) or other persistent memory and having a name or other identifier that distinguishes it from other PCPIs taken at other points in time.

In the case of the write anywhere file system, a PCPI is always an active file system image that contains complete information about the file system, including all meta-data. A PCPI can also include other information (meta-data) about the active file system at the particular point in time for which the image is taken. The terms "PCPI" and "snap-shot" may be used interchangeably through out this patent without derogation of Network Appliance's trademark rights. In the example of a WAFL file system, PCPIs are described in TR3002 File System Design for a NFS File Server System by David Hitz et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz et al., each of which is hereby incorporated by reference as though full set forth herein.

Figure 8:
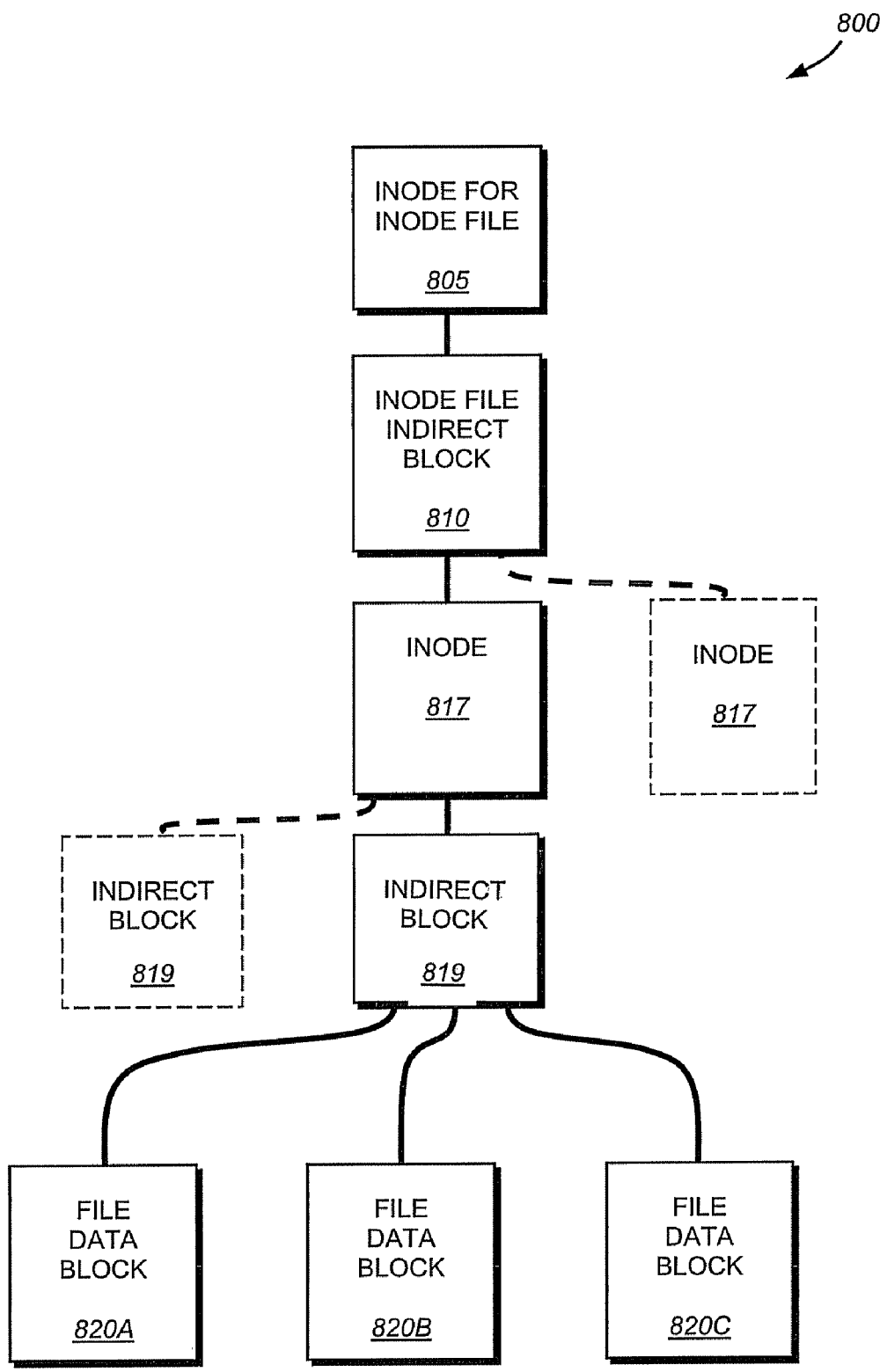
FIG. 8 is a schematic block diagram of an on-disk buffer tree in accordance with embodiment of the present invention.

Broadly stated, a PCPI is stored on-disk along with the active file system, and is called into the memory of the storage system as requested by the storage operating system. The on-disk organization of the snapshot and the active file system can be understood from the following description of an exemplary file system inode structure 800 shown in FIG. 8. The inode for an inode file 805 contains information describing the inode file associated with a file system. In this exemplary file system inode structure, the inode for the inode file 805 contains a pointer that references (points to) an inode file indirect block 810. The inode file indirect block 810 contains a set of pointers that reference inode file blocks, each of which contains an array of inodes 817 which, in turn, contain pointers to indirect blocks 819. The indirect blocks 819 include pointers to file data blocks 820A, 820B and 820C. Each of the file data blocks 820(A-C) is capable of storing, e.g., 4 KB of data.

Figure 9:
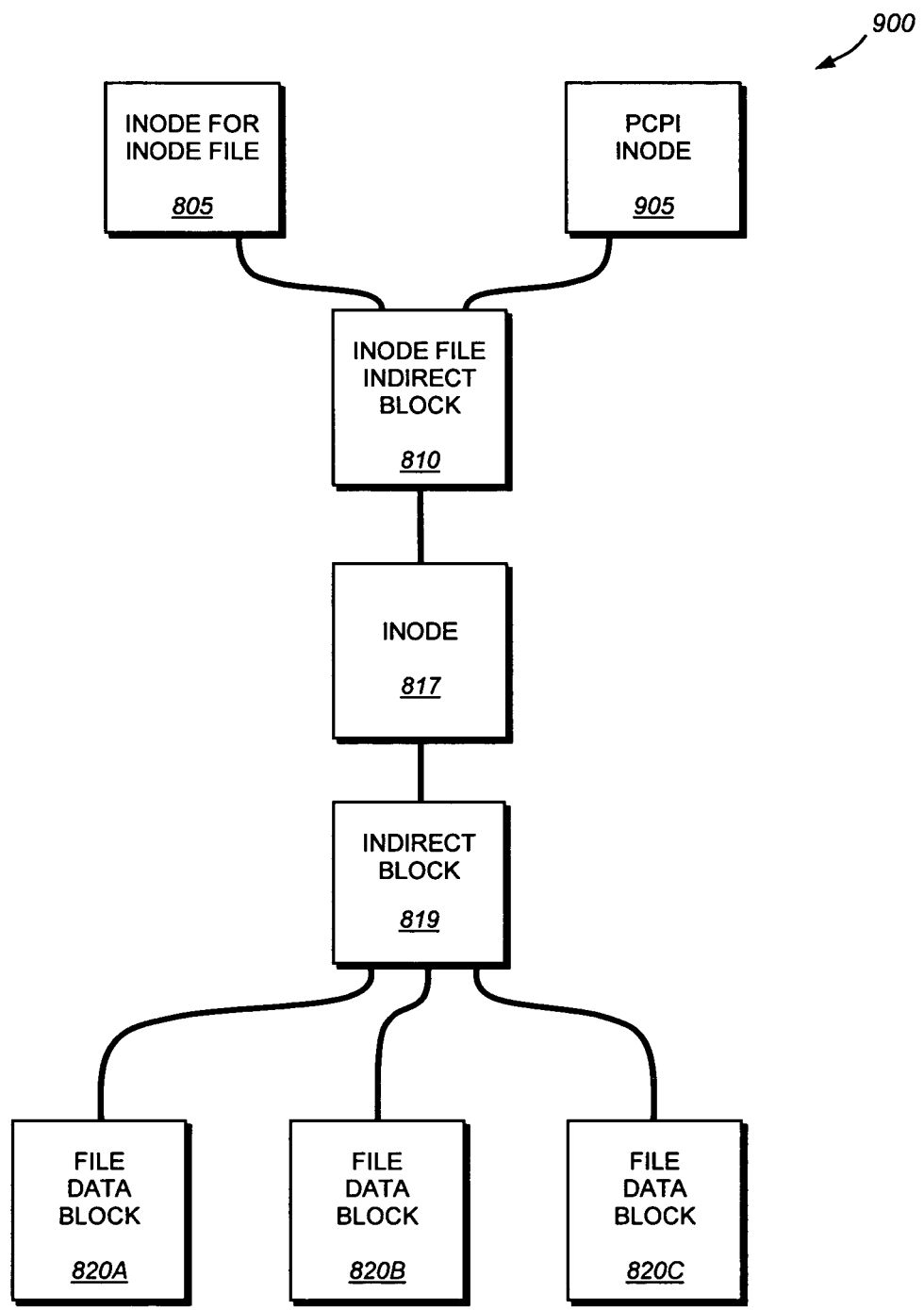
FIG. 9 is a schematic block diagram of an exemplary buffer tree showing the creation of a persistent consistency point image (PCPI) of a buffer tree.
Figure 10:
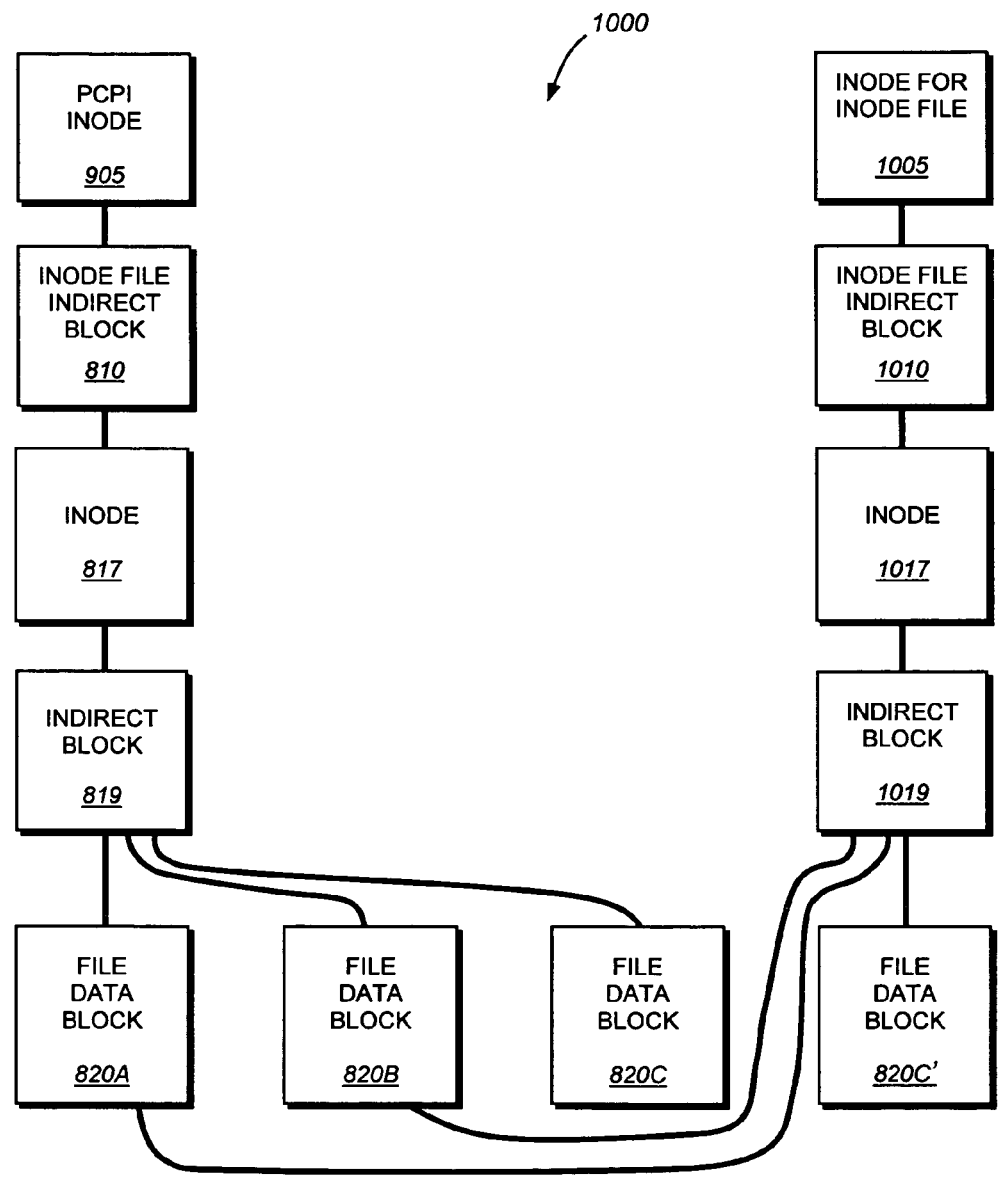
FIG. 10 is a schematic block diagram of an exemplary buffer tree and PCPI after new data has been written following the creation of a PCPI in accordance with embodiment of the present invention.

When the file system generates a PCPI of its active file system, a PCPI inode is generated as shown in FIG. 9. The PCPI inode 905 is, in essence, a duplicate copy of the inode for the inode file 805 of the file system 800 that shares common parts, such as inodes and blocks, with the active file system. For example, the exemplary file system structure 800 includes the inode file indirect blocks 810, inodes 817, indirect blocks 819 and file data blocks 820A-C as in FIG. 8. When a user modifies a file data block, the file system writes the new data block to disk and changes the active file system to point to the newly created block. FIG. 10 shows an exemplary inode file system structure 1000 after a file data block has been modified. In this example, file data block 820C is modified to file data block 1020C'. As a result, the contents of the modified file data block are written to a new location on disk as a function of the exemplary file system. Because of this new location, the indirect block 1019 must be rewritten. Due to this changed indirect block 1019, the inode 1017 must be rewritten. Similarly, the inode file indirect block 1010 and the inode for the inode file 1005 must be rewritten.

Thus, after a file data block has been modified the PCPI inode 905 contains a pointer to the original inode file indirect block 810 which, in turn, contains pointers through the inode 817 and indirect block 819 to the original file data blocks 820A, 820B and 820C. The newly written indirect block 1019 also includes pointers to unmodified file data blocks 820A and 820B. That is, the unmodified data blocks in the file of the active file system are shared with corresponding data blocks in the PCPI file, with only those blocks that have been modified in the active file system being different than those of the PCPI file.

However, the indirect block 1019 further contains a pointer to the modified file data block 1020C' representing the new arrangement of the active file system. A new inode for the inode file 1005 is established representing the new structure 1000. Note that meta-data (not shown) stored in any snapshotted blocks (e.g., 905, 810, and 820C) protects these blocks from being recycled or overwritten until they are released from all snapshots. Thus, while the active file system inode for the inode file 1005 points to new blocks 1010, 1017, 1019, 820A, 820B and 1020C', the old blocks 905, 810 and 820C are retained until the snapshot is fully released.

E. Client Generated Content on an Exported Logical Unit Number (lun)

The present invention provides a system and method for examining contents of a client file system overlaid onto a data container, such as a lun, exported by a storage system. A client side agent interfaces with the client file system to determine the logical block layout of files, directories and other data containers within the client file system. The block layout information is then transmitted to the storage system so that the storage system's file system may have knowledge of the application data container content overlaid onto the exported lun. Such knowledge enables the storage system to perform additional data management and/or data protection techniques.

Illustratively, the storage operating system executing on the storage system may generate a shadow volume, which is a file-level accessible volume that shares the level 0 data blocks with a volume of the client file system but is implemented in terms of the storage system's native file system semantics. The shadow volume may then be utilized in conjunction with data management techniques available to the storage system. For example, the shadow volume may be exported using file level protocols, such as the NFS protocol. Additionally, the shadow volume may be mirrored using conventional file-level mirroring techniques.

Figure 11:
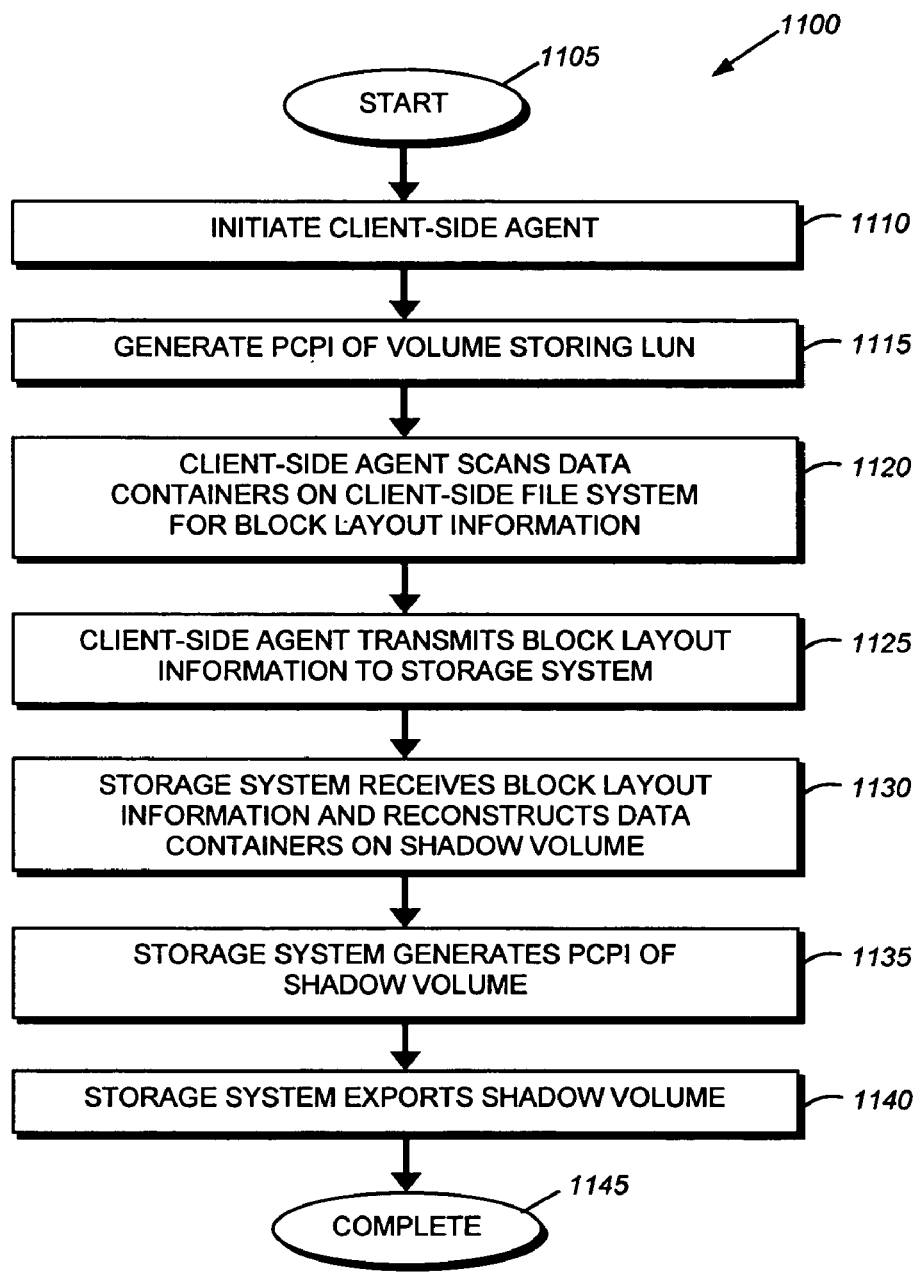
FIG. 11 is a flowchart detailing the steps of a procedure for examining the content of a client file system overlaid onto a logical unit number in accordance with embodiment of the present invention.

FIG. 11 is a flowchart detailing the steps of a procedure for generating a shadow volume in accordance with an embodiment of the present invention. The procedure 1100 begins in step 1105 and continues to step 1110 where the client agent is initiated (activated). The client agent may be activated by, for example, an administrator utilizing a command line interface (CLI) or a graphical user interface (GUI). Alternately, the client agent may be configured to execute at set times or in response to predetermined events occurring. In response to being activated, the agent causes a PCPI to be generated of the volume storing the lun that is exported (step 1115). This may be performed by, for example, the client agent sending a remote procedure call (RPC) to the storage operating system executing on the storage system instructing the storage operating system to generate a PCPI of the appropriate volume. The client agent then scans the data containers stored within the client file system for block layout information in step 1120. In the illustrative embodiment, the client performs this scan by utilizing conventional file system application program interface (API) commands. Many file systems, such as NTFS, provide APIs for discovering block layout information for use in, e.g., backup operations or defragmentation operations. These APIs are utilized by the client agent to obtain the block layout information. The block layout information illustratively identifies those blocks of the exported lun on which data is stored for a particular data container. For example, the block layout information may identify that the first block of the data container within the client file system is stored on block 4000 of the lun.

The client agent transmits this block layout information to the storage system in step 1125. Illustratively, the block layout information is transmitted using vendor-specific SCSI operations, described further below. However, in alternate embodiments, the block layout information may be transmitted using RPCs or other forms of computer to computer communication. As such, the description of using vendor-specific SCSI commands should be taken as exemplary only. The storage system receives the block layout information and reconstructs the data containers in a shadow volume in step 1130. A shadow volume is a volume within the storage system's file system that shares level 0 data blocks with the exported lun. That is, the actual data of the container is utilized to serve both the client file system and the storage system's file system. However, by creating a file system volume of the storage system, various storage system data management techniques, such as file level mirroring, may be performed. When creating the shadow volume, the storage system creates a buffer tree pointing to the same data blocks of the data container as are utilized within the exported lun. Once all of the data has been received, and the shadow volume is fully populated, the storage system generates a PCPI of the shadow volume in step 1135 before exporting the shadow volume in step 1140. Exporting of the shadow volume enables clients to access the shadow volume using file level protocols, such as NFS. The procedure then completes in step 1145.

Figure 12:
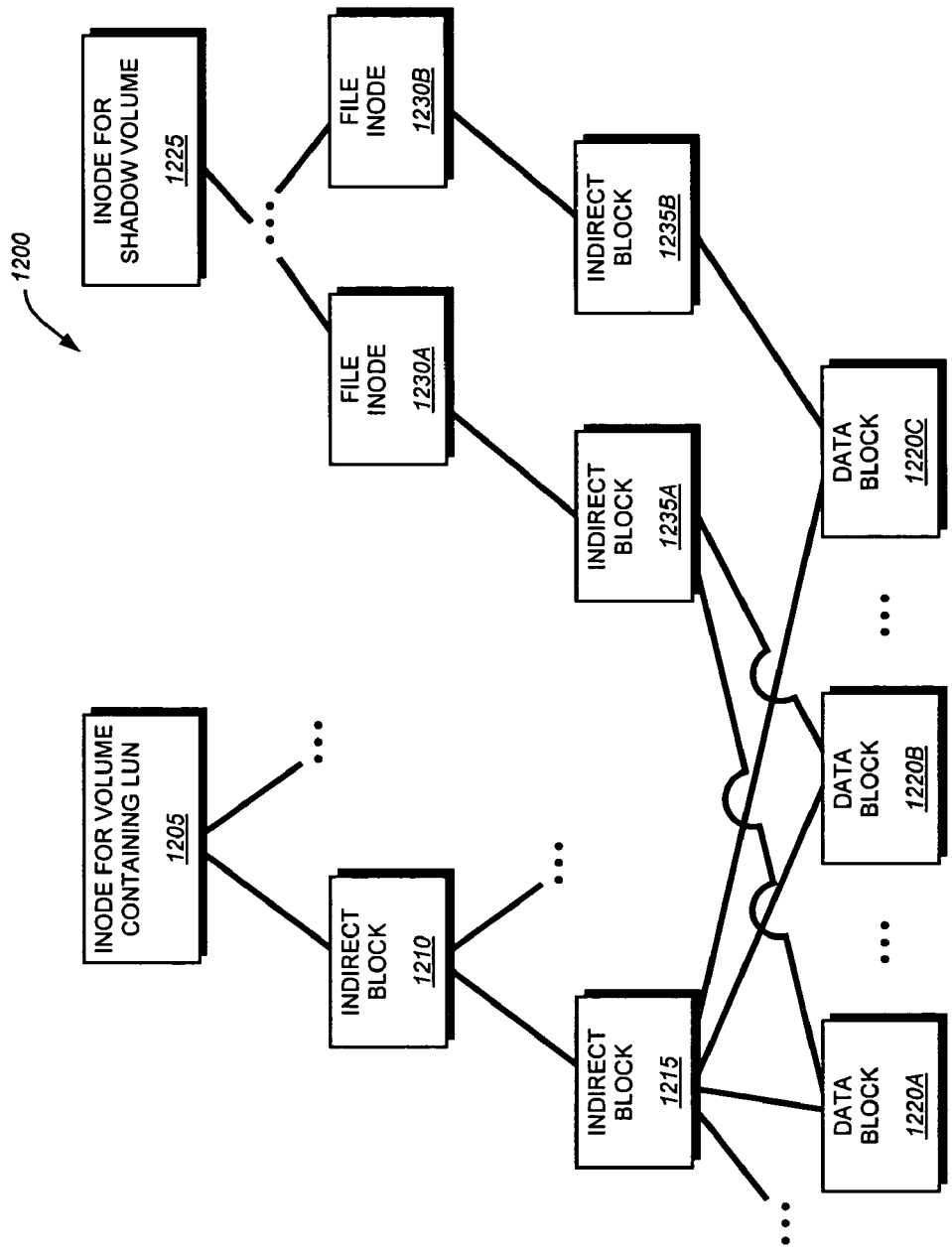
FIG. 12 is a schematic block diagram showing the creation of a shadow volume in accordance with embodiment of the present invention.

FIG. 12 is a schematic block diagram of an exemplary buffer tree 1200 showing the sharing of common data blocks between an exported lun and a shadow volume in accordance with an embodiment of the present invention. An inode for the volume containing the lun 1205 is a top level object of a first buffer tree. The inode for the volume containing the lun 1205 is an inode stored within the file system representing the lun that is exported to the clients. The inode for the volume 1205 may reference one or more levels of indirect blocks 1210, 1215 before reaching the level 0 data blocks 1220A, B, C. It should be noted that any number of indirect blocks may be utilized in accordance with the size of a lun. Thus, although two indirect blocks are shown, zero or more levels of indirect blocks may be utilized in accordance with the teachings of the invention. As such, the description of two levels of indirect blocks should be taken as exemplary only. The data blocks 1220 store the actual data that is written to the lun by the client file system. This data is organized using the client file system and, as such, is not readily understandable by the file system executing on the storage system. This limits the capabilities of the storage system in providing certain file-level operations. Accordingly, as described above, in accordance with an illustrative embodiment of the present invention, a shadow volume is generated.

An inode for the shadow volume 1225 references a buffer tree containing one or more file inodes 1230. Each file inode represents a file, directory or other data container stored within the shadow volume. Illustratively, for each data container created within the lun by the client file system, a file inode is generated. Thus, for example, if a file is stored on the client file system, a file inode representative of that file is generated. Each file inode may further reference one or more levels of indirect blocks 1235, which, in turn, point to various data blocks 1220. As can be appreciated, the data blocks, which store the end user data, may be associated with different file inodes within the shadow volume.

Illustratively, file inode 1230A, which represents file A within the shadow volume, points to indirect block 1235A which, in turn, points to data blocks 1220A, B. File inode 1230B, which represents file B, points to indirect block 1235B which points to data block 1220C. Thus, even though data blocks 1220A,B,C are referenced by a common indirect block 1215 of the lun, those blocks 1220A,B,C are logically associated with different data containers; e.g., data blocks 1220A,B are associated with file A (represented by inode 1230A), while data block 1220C is associated with file B (represented by inode 1230B).

Therefore, the file system is adapted to generate a shadow volume from block layout information received from the agent. The file system creates the appropriate inodes and indirect blocks for the storage system's file system, but utilizes the providing stored data blocks that comprise the exported lun.

Figure 13:
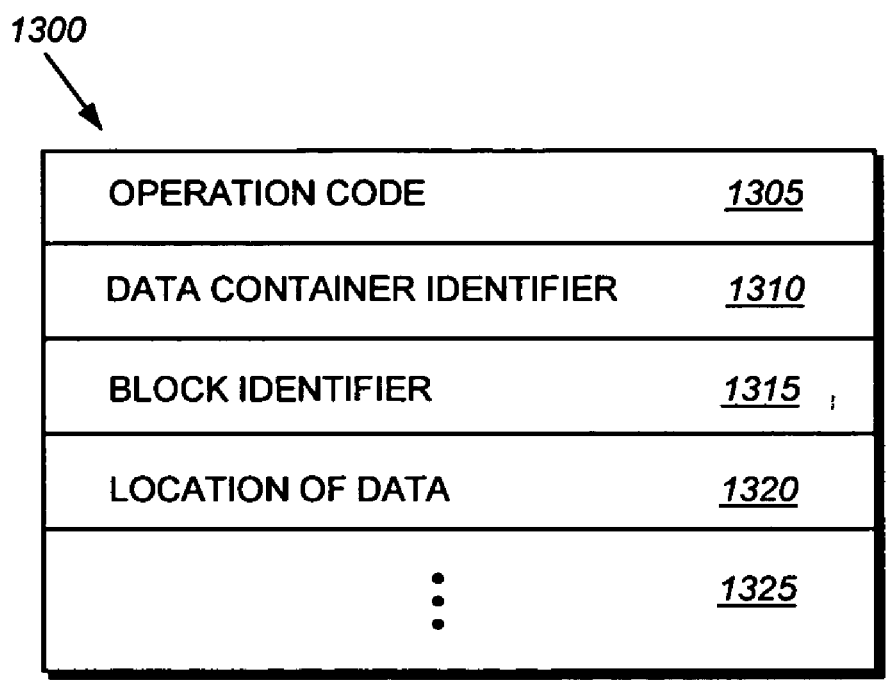
FIG. 13 is a schematic block diagram of an exemplary vendor-specific SCSI command for transmitting block layout information in accordance with embodiment of the present invention.

FIG. 13 is a schematic block diagram of an exemplary vendor-specific SCSI command data structure 1300 in accordance with embodiment of the present invention. The command data structure 1300 includes an operation code field 1305, a data container identifier field 1310, a block identifier field 1315, a location of data field 1320 and, an alternate embodiments, additional fields 1325. The operation code field 1305 identifies the command as a vendor-specific SCSI command that is carrying block layout information in accordance with an embodiment of the present invention. The data container identifier field 1310 contains an identifier of the particular data container stored within the client-level file system to which this block information pertains. The block identifier field 1315 contains an identifier (vol) of a particular block of data within the data container identified by the data container identifier field 1310. The location of data field 1320 identifies the location within the lun of the block of data identified by the block identification field 1315. Thus, for example, the content of the data container identifier field 1310 specifies that the block layout information is in reference to a file/foo/bar. The content of the block identifier field 1315 the id of the first block of the file and the content of the location of data field 1320 specifies that the first block of the file is stored in block 3000 of the exported lun. Using this information, the file system may create a shadow volume, as described above.

In an alternate embodiment, the block layout information may be utilized to restore a sub-volume data container from a PCPI. When a data container stored on the client file system becomes corrupted, an administrator executes a restore program. The restore program, in conjunction with the client side agent, identifies blocks of the storage system file system that are associated with the corrupted data container. If these blocks have not been modified since the creation of the PCPI, then the client side agent requests the storage system to promote the identified blocks from the PCPI to the active file system. In response, the storage system promotes the identified blocks, thereby restoring the corrupted data container to a non-corrupted state.

Figure 14:
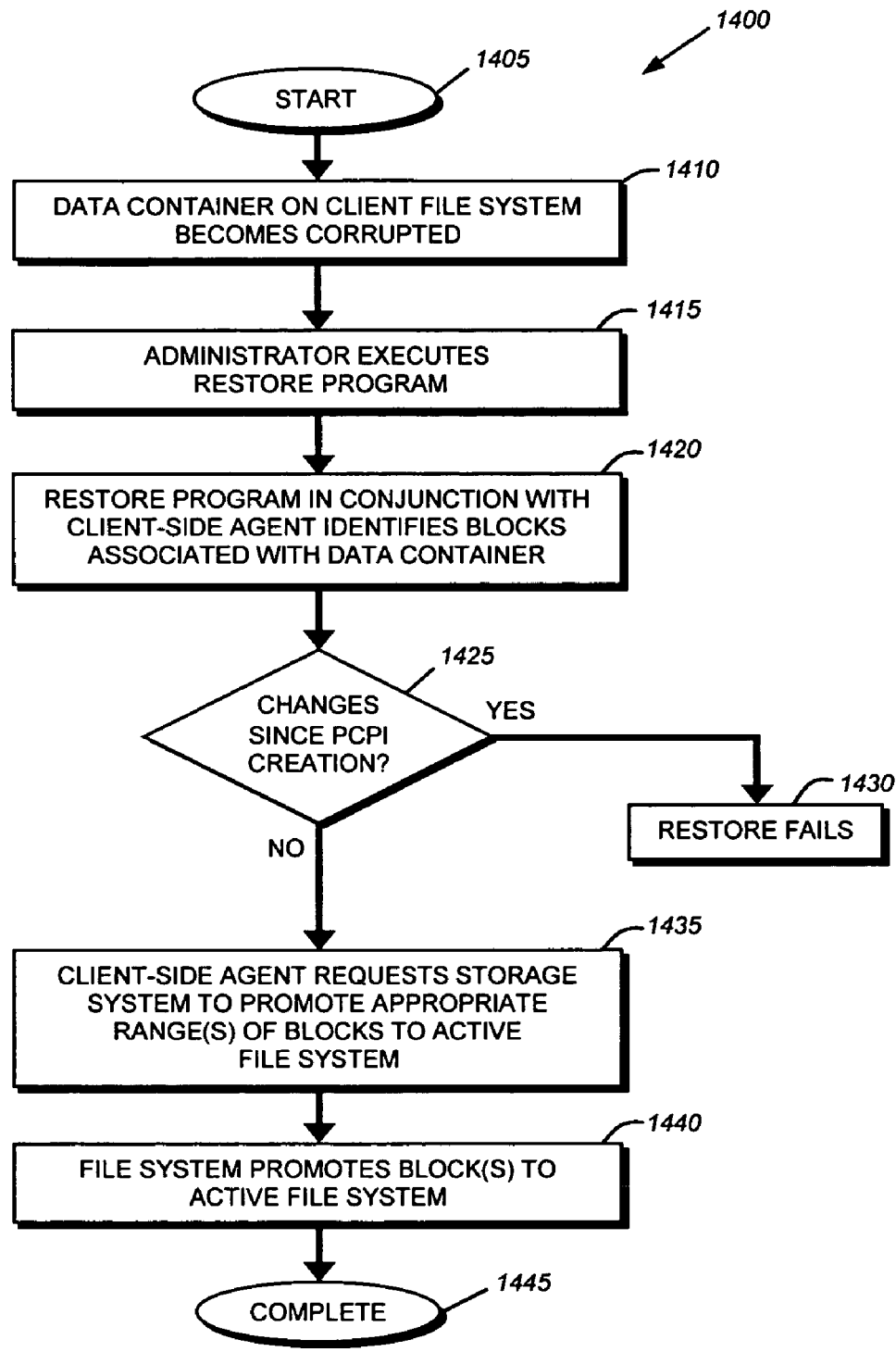
FIG. 14 is a flowchart detailing the steps of a procedure for restoring a sub-volume data container in accordance with embodiment of the present invention.

FIG. 14 is a flowchart detailing the steps of a procedure for restoring a sub-volume data container in accordance with embodiment of the present invention. The procedure 1400 begins in step 1405 and continues to step 1410 where a data container on the host file system becomes corrupted. In response, an administrator executes a restore program in step 1415. In step 1420 the restore program, in conjunction with the host-side agent, identifies the blocks associated with the corrupted data container by, as described above, interfacing with the client file system using an API to retrieve block layout information. In step 1425, the restore program determines whether there have been any changes to the data container since the last PCPI was created. If so, then the operation restoration fails in step 1430. However, if there have been no changes, the procedure continues to step 1435 where the client agent requests the storage system to promote the appropriate ranges of blocks to the active file system from the PCPI by, e.g., the agent sending a RPC or other interprocess communication to the storage system. In response, the storage system promotes the blocks to the active file system in step 1440, thereby returning the data container within the client file system to its status at a previous point in time. Note that "promote" denotes copying of the data from the corresponding blocks within the PCPI to the corresponding blocks of the active file system. The procedure then completes in step 1445.

To again summarize, the present invention enables a storage operating system and a file system of a storage system that exports a virtual disk as a lun to a client to understand the file or other data container level objects stored on lun within the overlaid client file system. By sending the block layout information for data containers to the storage system, the client agent enables the storage system, and the storage operating system executing thereon, to perform various data management techniques/functions that would otherwise be unavailable.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. It is thus the object of the appended claims to cover all such variations and modifications as come within the true spirit and scope of the invention.

What is claimed is:

1. A computer system configured to examine client generated content stored on a client computer file system, comprising:
    an agent executed by a processor configured to determine a block layout information of a data container stored within the client computer file system, wherein the block layout information of the data container is implemented in terms of native file system semantic of the client computer file system, and wherein the data container stored within the client computer file system is overlaid onto a logical unit number exported to the client computer file system by a storage system;
    wherein the agent is further configured to transmit the block layout information of the data container stored within the client computer file system to the storage system; and
    a file system of the storage system configured to receive the block layout information and reconstruct a volume within the storage system file system from the block layout information, wherein the volume is implemented in terms of native file system semantic of the storage system and configured to share data blocks with the exported logical unit number.

2. The computer system of claim 1 wherein the client file system comprises NTFS.

3. The computer system of claim 1 wherein the reconstructed volume is a shadow volume.

4. The computer system of claim 3 wherein the shadow volume is accessible via a file-level protocol.

5. The computer system of claim 1 further comprising:
    a restore program configured to restore a data container stored within the client computer file system from a persistent consistency point image containing the logical unit number.

6. The computer system of claim 1 wherein the block layout information comprises a data container identifier, a location within the data container and a block location.

7. The computer system of claim 1 wherein the block layout information is transmitted to the storage system using a small computer systems interface (SCSI) command.

8. The computer system of claim 7 wherein the SCSI command comprises an operation code field, a data container information field, a block identifier field and a data location field.

9. The computer system of claim 8 wherein the data container field identifies one of the data containers stored within the client computer file system.

10. The computer system of claim 1 wherein the agent is further configured to interface with a non-file system application.

11. The computer system of claim 1 wherein the agent is further configured to identify one or more blocks of the storage system associated with a corrupted data container to determine if the identified one or more blocks have not been modified since the creation of a persistent consistency point image and further configured to restore, in response to determining that the identified one or more blocks have not been modified since the creation of the persistent consistency point image, the corrupted data container to a non-corrupted state.

12. The computer system of claim 1 wherein the storage system is further configured to export a logical unit number to the client computer file system, the client computer file system overlaid onto the logical unit number exported by the storage system.

13. A method for generating a volume on a storage system, comprising:
generating a persistent consistency point image of a volume storing a logical unit number on the storage system;
exporting the logical unit number to a client computer file system of a client computer;
scanning a data container stored on the client computer file system overlaid onto the logical unit number exported to the client computer file system and obtaining block layout information of the data container stored on the client computer, wherein the block layout information of the data container is implemented in terms of native file system semantic of the client computer file system;
transmitting the block layout information of the data container stored on the client computer to the storage system; and
generating, by the storage system, a shadow volume within the storage system using the block layout information transmitted from the client computer, wherein the shadow volume is implemented in terms of native file system semantic of the storage system.

14. The method of claim 13 further comprising exporting the shadow volume.

15. The method of claim 13 wherein the data container storing the logical unit number comprises a volume.

16. The method of claim 13 wherein the block layout information comprises a data container identifier, a location within the data container and a block location.

17. The method of claim 13 wherein transmitting the block layout information comprises transmitting one or more small computer systems interface (SCSI) commands.

18. The method of claim 13 further comprising:
creating an inode for the volume storing the logical unit number;
creating an inode for the shadow volume; and
sharing, between the inode for the volume storing the logical unit number and the inode for the shadow volume, at least one data block.

19. The method of claim 13 further comprising generating a persistent consistency point image of the shadow volume.

20. The method of claim 13 further comprising generating a file inode for each data container created within the logical unit number by the client computer file system.

21. The method of claim 20 further comprising associating at least one data block with at least one different file inode within the shadow volume.

22. The method of claim 13 further comprising creating inodes and indirect blocks for a file system of the storage system utilizing the block layout information.

23. The method of claim 13 further comprising:
identifying one or more blocks of the storage system associated with a corrupted data container of the client computer file system;
determining if the identified one or more blocks have not been modified since the creation of the persistent consistency point image; and
restoring, in response to not having been modified since the creation of the persistent consistency point image, the corrupted data container to a non-corrupted state.

24. A method comprising:
retrieving block layout information related to data containers stored within a client computer file system, wherein the block layout information related to the data containers is implemented in terms of native file system semantic of the client computer file system; and
transmitting the block layout information to the storage system; and
reconstructing, by the storage system, the data containers stored within the client file system in a shadow volume, wherein the shadow volume is implemented in terms of native file system semantic of the storage system.

25. The method of claim 24 wherein the client file system comprises NTFS.

26. The method of claim 24 further comprising generating a shadow volume using the transmitted block layout information.

27. The method of claim 26 further comprising exporting the shadow volume to the client computer file system to be accessible via a file-level protocol.

28. The method of claim 24 further comprising restoring a data container within the client computer file system from a persistent consistency point image containing a logical unit number.

29. The method of claim 24 wherein the block layout information comprises a data container identifier, a location within the data container and a block location.

30. The method of claim 24 wherein the block layout information is transmitted to the storage system using a small computer systems interface (SCSI) command.

31. The method of claim 30 wherein the SCSI command comprises an operation code field, a data container information field, a block identifier field, and a data location field.

32. The method of claim 31 wherein the data container field identifies one of the data containers stored within the client computer file system.

33. The method of claim 24 further comprising causing a storage operating system executing on the storage system to generate a persistent consistency point image.

34. The method of claim 24 further comprising:
identifying one or more blocks of the storage system associated with a corrupted data container of the client computer file system;
determining if the identified one or more blocks have not been modified since the creation of a persistent consistency point image; and
restoring, in response to not having been modified since the creation of the persistent consistency point image, the corrupted data container to a non-corrupted state.

35. The method of claim 24 further comprising: creating a first inode for a volume containing a logical unit number; creating a second inode using the block layout information; and sharing, between the first and the second inode, at least one data block.

36. A computer readable medium containing executable program instructions executed by a processor, comprising:
program instructions that generate a persistent consistency point image of a volume storing a logical unit number on a storage system;
program instructions that export the logical unit number to a client computer file system of a client computer;
program instructions that scan a data container stored on a client computer file system overlaid onto the logical unit number exported to the client computer file system and obtaining block layout information of the data container stored on the client computer, wherein the block layout information of the data container is implemented in terms of native file system semantic of the client computer file system;

program instructions that transmit the block layout information of the data container stored on the client computer to the storage system; and program instructions that generate, by the storage system, a shadow volume within the storage system using the block layout information transmitted from the client computer, wherein the shadow volume is implemented in terms of native file system semantic of the storage system.

37. A computer system configured to examine client generated content stored on a client computer file system, comprising:

a storage system of the computer system configured to export a logical unit number to the client computer file system, the client file system overlaid onto the logical unit number exported by the storage system;

an agent configured to determine block layout information of a data container stored within the client computer file system, wherein the block layout information of the data container is implemented in terms of native file system semantic of the client computer file system;

the agent further configured to transmit the block layout information of the data container stored within the client computer file system to the storage system, wherein the storage system is further configured to reconstruct the data container in a shadow volume, in response to the block layout information of the data container stored within the client computer file system, wherein the shadow volume is implemented in terms of native file system semantic of the storage system, the storage system further configured to store the shadow volume; and wherein the storage system is further configured to export the shadow volume to be stored on the client computer file system.

38. The computer system of claim 37 wherein the block layout information comprises a data container identifier, a location within the data container, and a block location.

39. The computer system of claim 37 further comprising a small computer systems interface (SCSI) command, wherein the SCSI command comprises an operation code field, a data container information field, a block identifier field and a data location field.

40. The computer system of claim 37 wherein the agent is further configured to interface with a non-file system application.

41. The computer system of claim 37 wherein the agent is further configured to identify one or more blocks of the storage system associated with a corrupted data container, further configured to determine if the identified one or more blocks have not been modified since the creation of a persistent consistency point image, and further configured to restore, in response to not having been modified since the creation of the persistent consistency point image, the corrupted data container to a non-corrupted state.

42. The computer system of claim 37 wherein the agent is further configured to cause a storage operating system executing on the storage system to generate a persistent consistency point image.

43. A method for operating a computer data storage system, comprising:

overlaying one or more data containers onto a logical unit number exported by the computer data storage system, the one or more data containers stored within a client computer file system;

scanning the one or more data containers stored within the client computer file system for block layout information, wherein the block layout information is implemented in terms of native file system semantic of the client file system;

transmitting the logical block layout information of the one or more data containers to a file system of the computer data storage system;

identifying, in response to the block layout information, one or more data blocks of the logical unit number which pertains to a particular data container of the one or more data containers stored within the client computer file system, the data blocks of the logical unit number stored on the computer data storage system;

reconstructing, by the computer data storage system, the client computer file system data containers in a shadow volume, wherein the shadow volume is implemented in terms of native file system semantic of the computer data storage system; and exporting the shadow volume to the client computer file system.

44. A computer readable medium containing executable program instructions executed by a processor, comprising:

program instructions that overlay one or more data containers onto a logical unit number exported by a computer data storage system, the one or more data containers stored within a client computer file system;

program instructions that scan the one or more data containers stored within the client computer file system for block layout information, wherein the block layout information is implemented in terms of native file system semantic of the client file system;

program instructions that transmit the logical block layout information of the one or more data containers to a file system of the computer data storage system;

program instructions that identify, in response to the block layout information, one or more data blocks of the logical unit number which pertains to a particular data container of the one or more data containers stored within the client computer file system, the data blocks of the logical unit number stored on the computer data storage system;

program instructions that reconstruct, by the computer data storage system, the client computer file system data containers in a shadow volume, wherein the shadow volume is implemented in terms of native file system semantic of the computer data storage system; and program instructions that export the shadow volume to the client computer file system.

* * * * *

UNITED STATES PATENT AND TRADEMARK OFFICE
CERTIFICATE OF CORRECTION

PATENT NO. : 7,685,178 B2
APPLICATION NO. : 11/590735
DATED : March 23, 2010
INVENTOR(S) : Vijayan Rajan It is certified that error appears in the above-identified patent and that said Letters Patent is hereby corrected as shown below:

In the Specification

In col. 4, line 49 should read:

is ~~lo~~ a special file type

In col. 7, line 23 should read:

that ~~Support~~ support emulation of a disk.

In col. 10, line 58 should read:

Network System Appliance, Inc.

In col. 13, line 50 should read:

snapshot ~~snap-shot~~ may be used

Signed and Sealed this
Fifth Day of November, 2013

Teresa Stanek Rea
*Deputy Director of the United States Patent and Trademark Office*